United States Patent
Nagappan et al.

(10) Patent No.: US 9,378,015 B2
(45) Date of Patent: Jun. 28, 2016

(54) PREDICTING DEFECTS IN CODE

(75) Inventors: Nachiappan Nagappan, Redmond, WA (US); Thomas Michael Josef Zimmermann, Bellevue, WA (US); Brendan Seamus Murphy, Cambridgeshire (GB); Andreas Zeller, Saarbruecken (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 647 days.

(21) Appl. No.: 12/538,871

(22) Filed: Aug. 11, 2009

(65) Prior Publication Data

US 2011/0041120 A1 Feb. 17, 2011

(51) Int. Cl.
  G06F 9/44 (2006.01)
  G06F 11/36 (2006.01)
(52) U.S. Cl.
  CPC .............. G06F 8/77 (2013.01); G06F 11/3616 (2013.01)
(58) Field of Classification Search
  CPC ................................ G06F 11/3616; G06F 8/77
  USPC ......................................................... 717/126
  See application file for complete search history.

(56) References Cited

U.S. PATENT DOCUMENTS

| | | | |
|---|---|---|---|
| 6,397,247 B1 | 5/2002 | Shirakawa et al. | |
| 7,089,250 B2 * | 8/2006 | Doganata et al. | |
| 8,286,143 B2 * | 10/2012 | Garimella et al. | 717/131 |
| 2005/0102654 A1 * | 5/2005 | Henderson et al. | 717/126 |
| 2008/0155508 A1 * | 6/2008 | Sarkar et al. | 717/126 |
| 2008/0178145 A1 * | 7/2008 | Lindley | 717/102 |
| 2008/0263507 A1 * | 10/2008 | Chang et al. | 717/104 |
| 2010/0180259 A1 * | 7/2010 | Lindley | 717/124 |

FOREIGN PATENT DOCUMENTS

EP 1420344 A2 5/2004

OTHER PUBLICATIONS

Ball, T.; 'Use of Relative Code Churn Measures to Predict System Defect Density'. ICSE '05 Preceedings of the 27th international conference on Software engineering, May 15-21, 2005, [online] ACM Digital Library [retreived on Mar. 26, 2012].*
Graves, Todd L. et al.; Predicting Fault Incidence Using Software Change History; IEEE Transaction on Software Engineering, vol. 26, No. 7, Jul. 2000; p. 653-661.*
Khoshgoftaar, Taghi M. et al; Detection of Software Modules with High Debug Code Churn in a Very Large Legacy System; ISSRE '96 Proceedings of The Seventh International Symposium on Software Reliability Engineering; p. 364-371.*
Hassan, Ahmed E. et al.; Predicting Faults Using the Complexity of Code Changes; ICSE'09, May 16-24, 2009; p. 78-88.*

(Continued)

*Primary Examiner* — Eric Oberly
(74) *Attorney, Agent, or Firm* — Alin Corie; Sandy Swain; Micky Minhas (57) ABSTRACT

A system is described herein that predicts defects in a portion of code of an application that is configured to execute on a computing device. Versions of code are analyzed to locate change bursts, which are alterations to at least one portion of code over time-related events. If a change burst is identified, defects are predicted with respect to the code based at least in part upon the identified change burst.

20 Claims, 7 Drawing Sheets

(56) References Cited

OTHER PUBLICATIONS

Levinson, Jeff et al.; Team Foundation Server Reports, visualstudiomagazine.com, May 19, 2008; retrevied Apr. 9, 2014, online, <URL: http://visualstudiomagazine.com/articles/2008/05/19/team-foundation-server-reports.aspx>.*

Graves, et al., "Predicting Fault Incidence Using Software Change History", retrieved at <<http://nisla05.niss.org/technicalreports/tr80.pdf>>, IEEE Transactions on Software Engineering, vol. XX, No. Y, Month 1999, pp. 100-108.

Kim, Sunghun, "Adaptive Bug Prediction by Analyzing Project History", retrieved at <<http://users.soe.ucsc.edu/~ejw/dissertations/AdaptiveBugPrediction_SungKim_Thesis.pdf>>, 2006, pp. 1-145.

Lee, et al., "On-Line Recovery for Rediscovered Software Problems", retrieved at <<http://ieeexplore.ieee.org/stamp/stamp.jsp?arnumber=00540209>>, IEEE, 1996, pp. 78-87.

"Software Change", retrieved at <<http://www.comp.lancs.ac.uk/computing/resources/IanS/SE7/ElectronicSupplements/SWChange.pdf>>, pp. 1-22.

Hoffmann, et al., "Advanced Failure Prediction in Complex Software Systems", retrieved at <<http://www2.informatik.hu-berlin.de/~gunho/hoffmann04advanced.pdf>>, Apr. 2004, pp. 1-19.

Polini, Andrea, "Software Evolution", retrieved at <<http://www1.isti.cnr.it/~polini/lucidiSE/evolution.pdf>>, 2006/2007, pp. 1-29.

Cao, et al., "The Software Failure Prediction Based on Fractal", retrieved at <<http://ieeexplore.ieee.org/xpl/freeabs_all.jsp?arnumber=4721317>>, Advanced Software Engineering & Its Applications, 2008, pp. 1-6.

Liu, et al., "Predict Software Failure-Prone by Learning Bayesian Network", retrieved at <<http://www.sersc.org/journals/IJAST/vol1/papers/05.pdf>>, International Journal of Advanced Science and Technology, pp. 35-42.

* cited by examiner

PREDICTING DEFECTS IN CODE

BACKGROUND

Over the last several years, personal computing devices have transformed from relatively high-cost, low-function machines to relatively inexpensive machines that can perform a plurality of tasks including but not limited to financial management tasks, Internet browsing, word processing, complex calculations, etc. This evolution of personal computers has been based at least in part upon advances in hardware, including but not limited to an increase in a number of transistors included in processors, an increase in memory space, an increase in hard drive space, amongst other hardware advances.

To efficiently use this hardware on personal computers, complex operating systems have been developed. For instance, an operating system may include several millions of lines of code. Furthermore, robust applications that can perform a plurality of tasks, ranging from relatively simple to relatively complex, have been developed to execute on one or more different types of operating systems. Similar to an operating system, an application may include a large number of lines of code.

Oftentimes, especially in connection with large or complex operating systems or applications, source code pertaining to an application will compile without any errors being detected. In some cases, however, the resulting compiled applications will not execute according to specifications or as expected by a developer or user.

Typically, an application or operating system is tested prior to such application or operating system being released to the public. Due to size and incredible amount of functionality that is associated with conventional applications and operating systems, it can be nearly impossible for testers to exhaustively test an operating system or application prior to release. After an application is released to the public, one or more users may report errors in how the application operates in certain situations or with certain types of hardware. The developer or developers of the application then generate a patch that corrects such problem and then transmits such patch to end users, for instance, via the Internet. Generating patches for released software tends to be relatively expensive for the developer of the software. For example, a single patch may cost a developer hundreds of thousands of dollars to generate and transmit to end users.

SUMMARY

The following is a brief summary of subject matter that is described in greater detail herein. This summary is not intended to be limiting as to the scope of the claims.

Described herein are various technologies pertaining to generating predictions with respect to defects in software, wherein the software can be or include an operating system, an application, a patch, or other suitable software. In connection with generating such predictions, one or more change bursts can be detected in a portion of code of the software (e.g., source code, binary code, ... ). For instance, the portion of the code may be a class, file, a package, a module, or some other suitable measure of element in code. Generally, a change burst can be a particular number of alterations to the portion of the code over a threshold number of time-related events. For instance, a change burst may be a relatively large number of alterations to the portion of the code over a relatively small amount of time (e.g., a four day period). Moreover, a time-related event may be an hour, a day, a week, or some other standard time unit. In another example, a time-related event may be a day in which a build is undertaken with respect to the software, a day in which a portion of code is checked in, etc. In such a case, weekends can be accounted for (e.g., builds or check-ins often do not occur over weekends and/or holidays.).

A change burst with respect to code of an application can be identified by accessing and analyzing version information pertaining to the code. In an example, the version information may be included in a version store (a data repository that retains different versions of the code over time). Each version of the code can be analyzed to ascertain whether the portion of the code of interest has been altered with respect to a previous version. If the portion of the code has been altered, a time event corresponding to such version can be obtained. This time event may then be compared with time events corresponding to other versions where the portion of the code of interest has been subject to alteration. If two alterations occur with respect to one another within a threshold number of time-related events (e.g., if a first alteration occurs within a number of time-related events that are less than or equal to a threshold), such alterations can be "grouped" together. If a threshold number of alterations are grouped together (e.g., if a number of alterations in a group are greater than or equal to a threshold), then such alterations can be defined as a change burst.

In another example, rather than accessing a version store, version information can be analyzed during development of the code. For example, an incremental analysis can be undertaken with respect to alterations to code during development of such code. Whenever a change has occurred to a portion of the code of interest, an event can be generated, wherein the event has metadata corresponding thereto to indicate that the portion of code has been altered at a certain time-related event. Again, if two alterations occur with respect to one another within a threshold number of time-related events, such alterations can be "grouped" together. If a threshold number of alterations are grouped together, then such alterations can be defined as a change burst.

Once one or more change bursts have been identified with respect to a certain portion of code, one or more metrics pertaining to the change bursts can be generated. Such metrics can include a number of time-related events in which the portion of the code has changed, a number of changes in a particular change burst, a number of change bursts corresponding to the portion of code, a size of a change burst; temporal metrics including a time that a change burst occurs, a time that a change burst of maximal size occurs; metrics pertaining to individuals including a number of people that correspond to changes in a change burst; trend metrics, including a total number of lines that have altered in the portion of code for a particular change burst, amongst other metrics. Such metrics may be utilized in connection with predicting that a defect may exist in the portion of code, that maintenance is likely to be needed with respect to the portion of the code, or to output recommendations such as recommending a number of individuals to employ in connection with maintaining code.

Other aspects will be appreciated upon reading and understanding the attached figures and description.

DETAILED DESCRIPTION

Various technologies pertaining to predicting defects in a portion of code of an application/operating system will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

Figure 1:
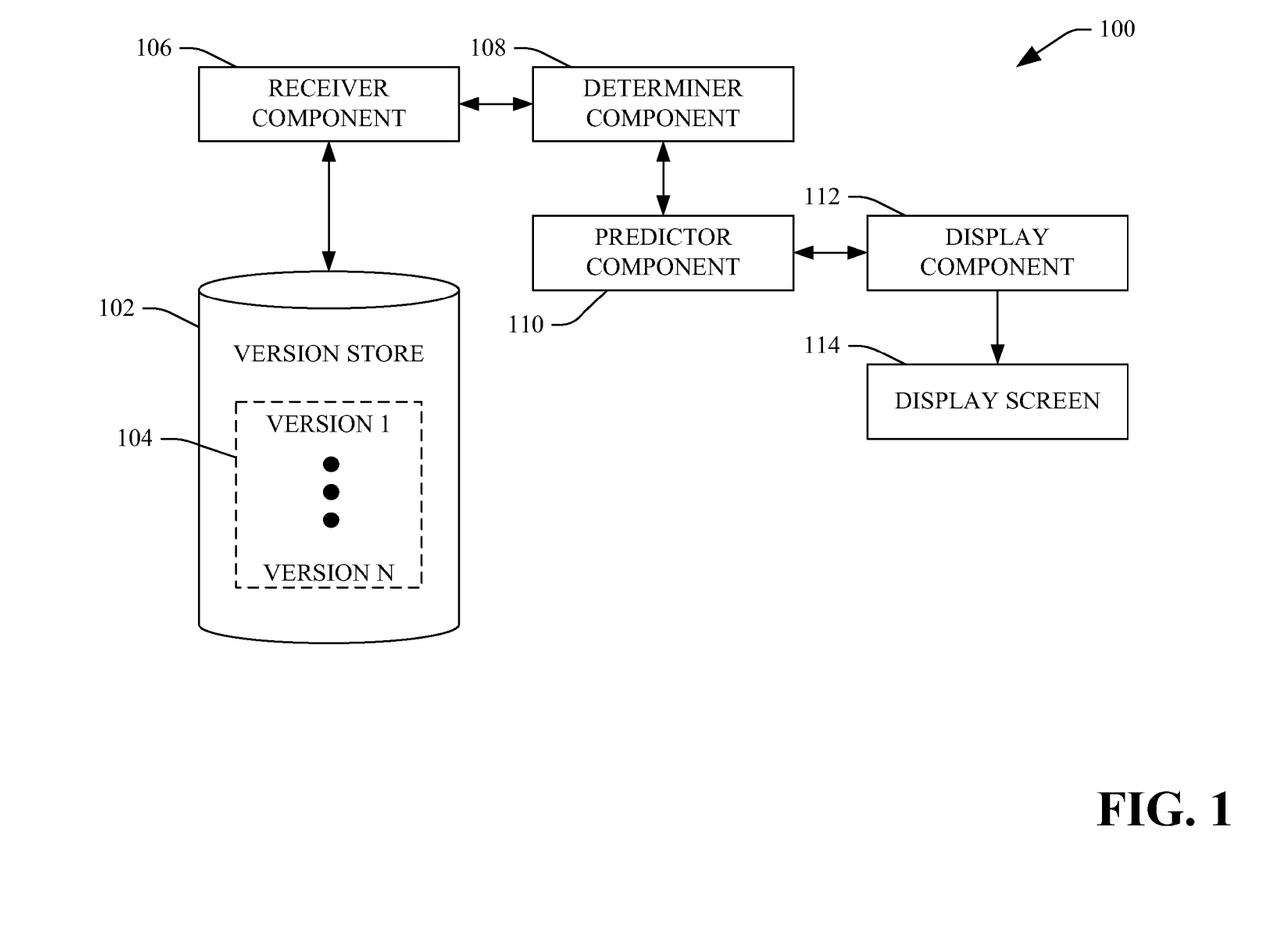
FIG. 1 is a functional block diagram of an example system that facilitates predicting defects in a portion of code.

With reference to FIG. 1, an example system 100 that facilitates predicting defects in a portion of code is illustrated. For instance, the system 100 may be included in an integrated development environment application or a build environment. Furthermore, the system 100 may be included in a personal computer, a server, a portable computing device, etc.

The system 100 optionally includes a version store 102 that can be configured to retain a plurality of different versions 104 of code. In an example, the code may be source code for an operating system or an application configured to execute on a personal computer, a binary pertaining to an operating system or application, or other suitable application/code. Version stores are known in the realm of software development, and configuration of the version store 102 may be any suitable configuration.

A receiver component 106 can have access to the version store 102. The receiver component 106 can receive data pertaining to the plurality of versions 104 in the version store 102, wherein such plurality of versions 104 include data pertaining to a particular portion of the code of interest. Such portion may be a portion of source code, a binary, a module, a class, a package, or other suitable portion of the code. Specifically, the portion may be an executable, a dynamic link library, a configuration file, or the like. Moreover, each of the versions 104 in the version store 102 may correspond to a different time-related event. For example, a time-related event may be a day, a week, an hour, etc. In another example, a time-related event may be a time unit pertaining to when a build of the software was undertaken or at least the portion of code was checked in (e.g., a day that a build of the code was undertaken or a day that at least the portion of the code was checked in).

The system 100 may further include a determiner component 108 that is in communication with the receiver component 106. The determiner component 108 can make a determination that a change burst exists with respect to the portion of the code of interest. A change burst as used herein is a threshold number of alterations made to the portion of the code of interest, wherein each alteration in the threshold number of alterations is within a threshold number of time-related events from another alteration in the threshold number of alterations (e.g., a number alterations is greater than or equal to a threshold number of alterations, and a number of time-related events between two alterations is less than or equal to a threshold). Thus, a change burst may be a frequent number of alterations of the portion of the code over a relatively short period of time. In an example, a change burst may be three alterations to the portion of code over a seven day period where builds were undertaken with respect to the code. Furthermore, as will be described in greater detail below, the determiner component 108 can ascertain various metrics pertaining to the identified change burst or change bursts, as well as other metrics pertaining to the portion of the code.

As indicated above, the time-related event may be a day in which a build occurs. In an example, it can be assumed that each build is created out of individual portions (classes, packages, modules, or other constituents). A portion C of code S can have a history across builds that can be represented by a series $C=<c_1, c_2, \ldots, c_{|S|}>$. If $c_i \neq c_{i+1}$, then the portion C has changed in build $s_i$. For each portion of the code, the determiner component 108 can identify change bursts as sequences of changes, wherein the determiner component 108 can identify change bursts through utilization of two parameters: gap size G and burst size $\beta$. The gap size is a maximum distance between two alterations, wherein distance refers to a number of time-related events between alterations. Two alterations with a distance therebetween that is less than or equal to G can be part of a same burst. The burst size $\beta$ determines a minimum number of alterations in a burst. If the number of changes in a burst b is greater than or equal to $\beta$, then the determiner component 108 will identify the burst b as a change burst.

More formally, a change burst that is identified by the determiner component 108 can be a sequence $B=<c_{i_1}, c_{i_2}, \ldots >$ with $i_1, i_2, \ldots, i_{|B|} \in \{1, \ldots, |C|\}$ such that $c_{i_k} \neq c_{i_{k+1}}$, $|B| \geq \beta$, and for all $1 \leq k < |B|$, $i_k \leq i_{k+1} \leq G$. The sequence bursts $(C)=<B_1, B_2, \ldots>$ of all change bursts for C may comprise the longest non-overlapping change bursts; e.g., $\Sigma_{i=1}^{|bursts(C)|} |B_i|$ is maximal, and $b_i \cap b_j = 0$ holds for all $b_i, b_j \in$ bursts(C) with $b_i \neq b_j$. The determiner component 108 can utilize such rules when identifying change bursts in a portion of code.

A predictor component 110 can be in communication with the determiner component 108. The predictor component 110 can be configured to generate a prediction that the portion of the code of interest has at least one defect based at least in part upon the determination made by the determiner component 108 that the change burst exists with respect to the portion of the code. For instance, a relatively large number of alterations to the portion of the code over a relatively small amount of time may be indicative of problems that developers had when attempting to cause an application/operating system to act as expected. Additionally or alternatively, the predictor component 110 can be configured to generate a prediction that maintenance may be required with respect to the portion of the code based at least in part upon the determination made by the determiner component 108 that at least one change burst exists with respect to the portion of the code of interest. In still yet another example, the predictor component 110 can be configured to output a recommendation based at least in part upon the determination made by the determiner component 108 that a change burst exists with respect to the portion of the code. Such recommendation may be, for instance, a recommendation to have a certain number of people in a particular group prepared to maintain the portion of the code. In another example, such recommendation may be a recommendation of how to price the code for sale based at least in part on expected maintenance costs.

The predictor component 110 may include any suitable prediction/recommendation algorithm or model. For instance, the predictor component 110 may be or include a regression model, a Bayesian belief network, an artificial neural network, a support vector machine, a classifier, may use collaborative filtering techniques, etc., in connection with outputting predictions/recommendations. Furthermore, the predictor component 110 may be trained and tested using any suitable training data as is known in the art.

The system 100 may further include a display component 112 that causes a prediction and/or recommendation output by the predictor component 110 to be displayed on a display screen 114 of a computing device. Thus, a project manager or developer can ascertain that the portion of the code is predicted to have a defect corresponding thereto, is predicted to have maintenance issues corresponding thereto, may review a recommendation pertaining to the portion of the code, etc., by viewing the display screen 114 of the computing device.

Moreover, the system 100 may be configured to output predictions/recommendations at different times during the course of development of the operating system/application. Furthermore, the determiner component 108 can be configured to review versions of the code over a particular range of time-related events. For example, a change burst that occurs more recently may be more highly indicative of a possible defect in the portion of the code when compared to a change burst that occurred earlier in a software development process. In another example, the determiner component 108 can be configured to determine whether a portion of code has a change burst corresponding thereto periodically, from time to time, as a background task in an integrated development environment application, etc.

While the system 100 has been described to detect change bursts in code through analysis of data in the version store 102, it is to be understood that change bursts can be detected through other methods/techniques. For instance, rather than accessing a version store, version information can be analyzed during development of the code. Thereafter, an incremental analysis can be undertaken with respect to alterations to code during development of such code. Whenever a change has occurred to a portion of the code of interest, an event can be generated, wherein the event has metadata corresponding thereto to indicate that the portion of code has been altered at a certain time-related event. Again, if two alterations occur with respect to one another within a threshold number of time-related events, such alterations can be "grouped" together. If a threshold number of alterations are grouped together, then such alterations can be defined as a change burst. Of course, other techniques for identifying alterations in code over time are contemplated and intended to fall under the scope of the hereto-appended claims.

Figure 2:
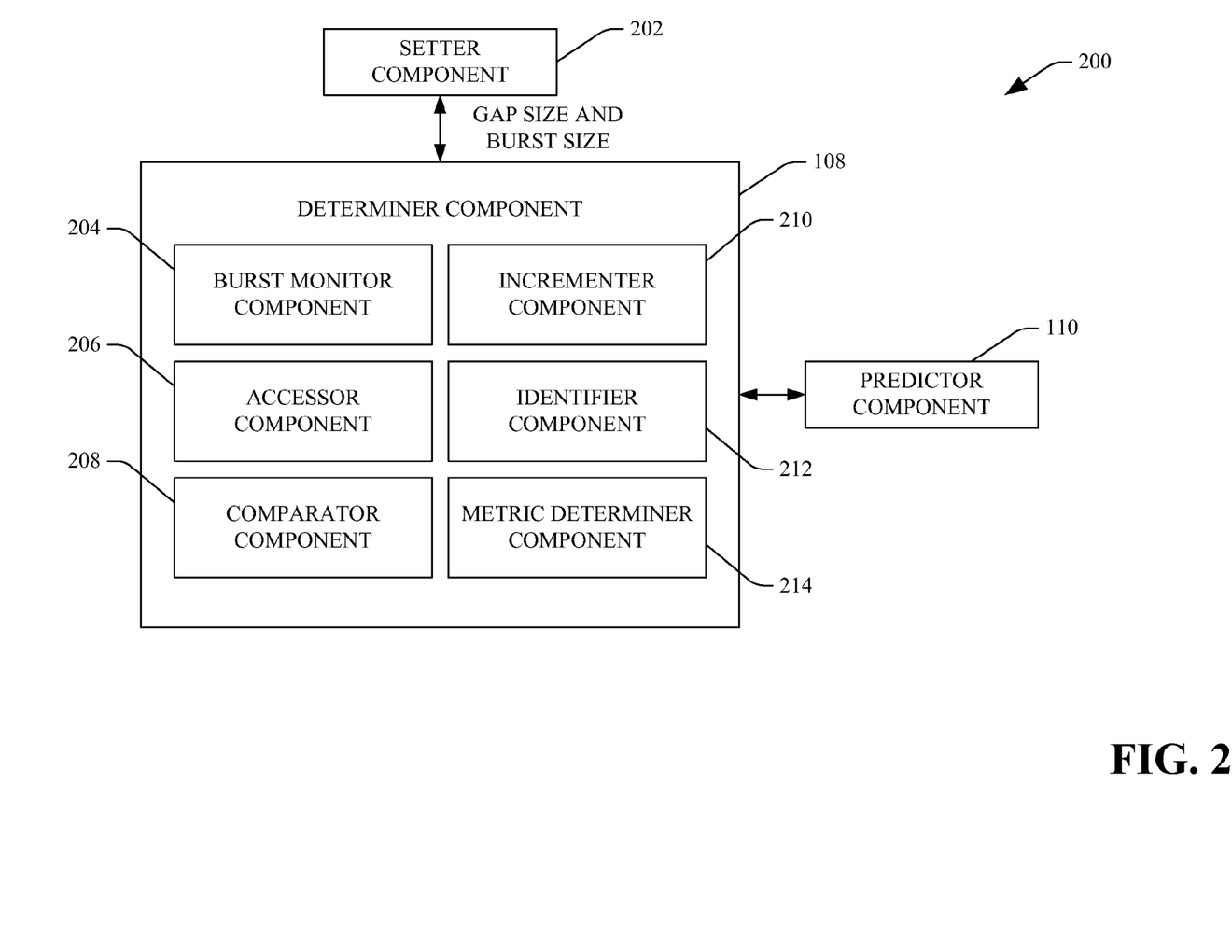
FIG. 2 is a functional block diagram of an example system that facilitates identifying change bursts pertaining to a portion of code.

Referring now to FIG. 2, an example system 200 that facilitates predicting that a portion of code has a defect is illustrated. The system 200 includes a setter component 202 that is configured to set a gap size and burst size (described above) to be utilized by the determiner component 108 when ascertaining whether or not a change burst exists with respect to a portion of code. For example, a developer can indicate the desired gap size and burst size, wherein such gap size and burst size may depend upon the application/operating system. For instance, for predicting defects in code of an operating system a first gap size and a first burst size may be desirable, while for predicting defects in code of a web browser a second gap size and a second burst size may be desirable. The gap size and burst size can be set automatically based upon complexity/identity of software or may be set manually or may be adjusted continuously as development progresses.

The determiner component 108 can receive the gap size and the burst size set by the setter component 202, and may determine whether one or more change bursts exists in the portion of the code using such gap size and the burst size. Pursuant to an example, the determiner component 108 may include a burst monitor component 204 that is configured to monitor a number of alterations that occur within the gap size set by the setter component 202. Thus, initially the burst monitor component 204 can set a current burst value to zero.

An accessor component 206 can access various versions of the code and ascertain whether alterations were made to the portion of the code of interest. Furthermore, the accessor component 206 can determine values of time-related events corresponding to alterations to the portion of the code of interest.

A comparator component 208 can compare values of the time-related events corresponding to the alterations in the portion of the code of interest, and can determine whether such alterations occurred within the gap size defined by the setter component 202. Thus the comparator component 208 can review two alterations to the portion of the code, and can ascertain whether a number of time-related events between such two alterations are less than or equal to the gap size set by the setter component 202. If the comparator component 208 determines that the number of time-related events between the two alterations is less than or equal to the threshold, an incrementor component 210 can increment the current burst value maintained by the burst monitor component 204. If the comparator component 208 is comparing alterations to the portion of the code that are initial alterations (e.g., the comparison includes an alteration that is a first alteration in a burst), the incrementor component 210 can set the current burst value to two, and thereafter increment such monitor value by one if alterations to the portion of the code continue to have a number of time-related events therebetween that is less than or equal to the gap size set by the setter component 202.

An identifier component 212 can analyze the current burst value to ascertain whether a change burst exists that satisfies the gap size and burst size set by the setter component 202. If the identifier component 212 ascertains that a change burst has occurred, the identifier component 212 can cause an indication of the change burst to be stored in a data repository.

The determiner component 108 may further include a metric determiner component 214 that can ascertain metrics corresponding to the portion of the code of interest. For example, the metric determiner component 214 can ascertain metrics corresponding to change bursts pertaining to the portion of the code. Such metrics may be used by the predictor component 110 in connection with outputting a prediction and/or recommendation.

Example metrics can include, but are not limited to, change metrics, temporal metrics, people metrics, and churn metrics. Change metrics can include a number of changes made to the portion of the code of interest (e.g., a number of builds in which the portion of the code is changed). Change metrics may also include a number of alterations to the portion of the code of interest that are "consecutive" in nature (each alteration occurs within the gap size of a subsequent alteration). Change metrics may also include a number of change bursts that exist with respect to the portion of the code, a number of alterations in a particular change burst, a number of alterations in a maximally sized change burst, etc.

Temporal metrics may be or include a value that indicates when in time a first change burst occurred (which can be normalized to a total number of builds), a value indicating a time when a most recent change burst occurred, a value indicating a time that a largest change burst occurred with respect to the portion of the code, amongst other temporal metrics. People metrics may include, but are not limited to, a total number of people who committed a change to the portion of the code of interest, a total number of people who are involved with respect to a particular change burst, and/or a maximum number of people involved with respect to a change burst corresponding to the portion of the code of interest. Finally, trend metrics may be or include a total number of lines of the portion of code that were altered over the lifetime of the portion of code, a total number of lines changed across all change bursts corresponding to the portion of the code, and/or a maximum number of lines changed over all change bursts corresponding to the portion of code of interest.

The predictor component 110 may use any suitable combination of such metrics, as well as other metrics, when generating predictions of defects and maintenance and/or outputting a recommendation pertaining to the portion of code of interest. Other metrics that may be used by the predictor component 110 can be or include an organizational structure of a company, churn data pertaining to other portions of the code, etc.

Figure 3:
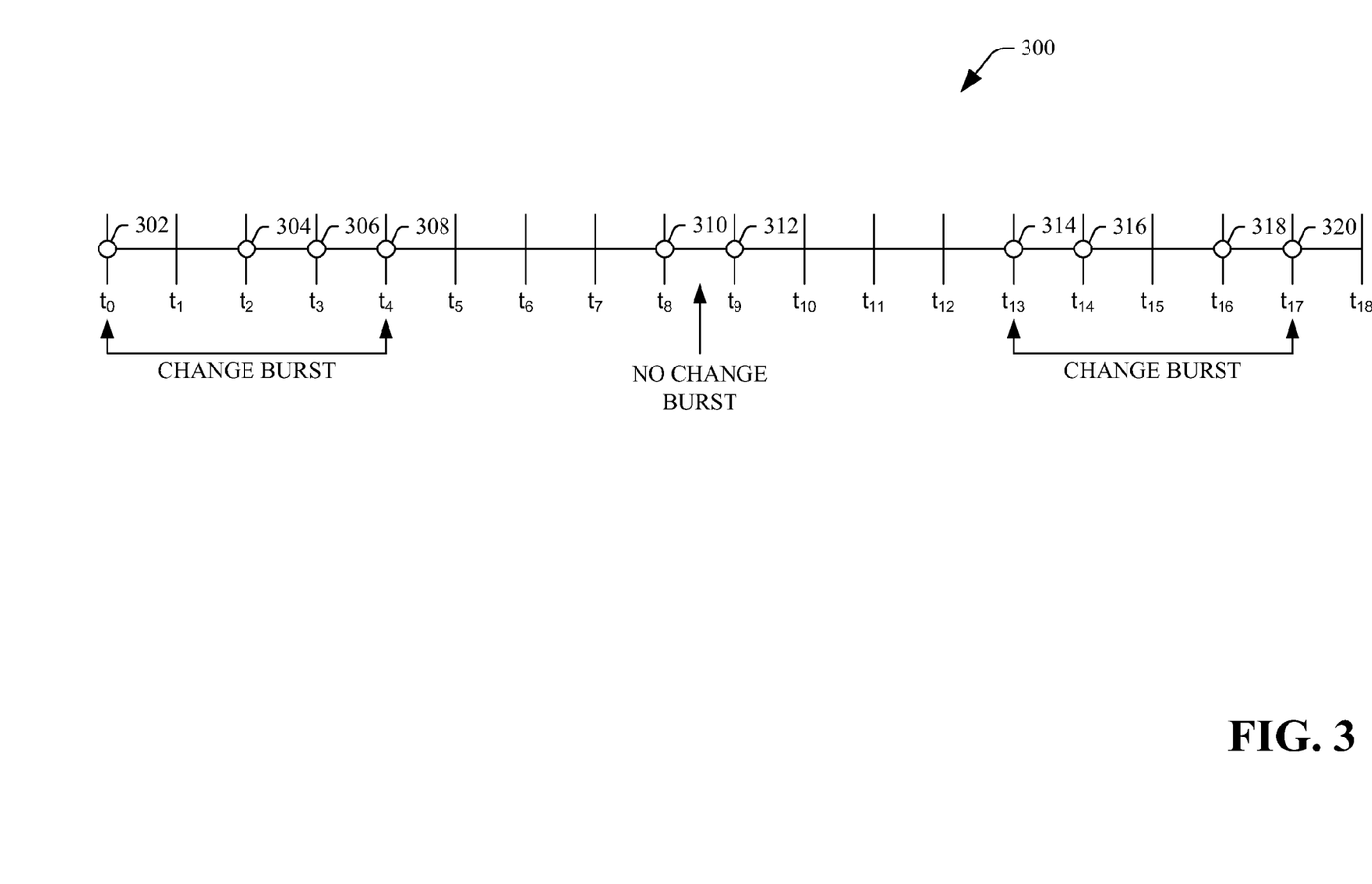
FIG. 3 is a graphical representation of alterations over time events.

Referring now to FIG. 3, an example graphical depiction 300 of alterations made to a portion of code over time is illustrated. In the example depicted in FIG. 3, the gap size may be 2 and the burst size may be 3. In the time frame shown in FIG. 3, nineteen time-related events have occurred. As noted above, such events may be days, days in which a build has occurred, days in which code has been checked in, etc. The first time-related event is shown at $t_0$, while the nineteenth time-related event is shown as $t_{18}$.

A first alteration 302 to a portion of the code of interest is shown to have occurred at time-related event $t_0$. A second alteration 304 is shown to have occurred at time-related event $t_2$. A third alteration 306 is shown to have occurred at time-related event $t_3$, and a fourth alteration 308 is shown to have occurred at time-related event $t_4$. The alterations 302-308 can collectively be identified as a change burst, as a gap between any of the alterations 302-308 is less than or equal to the gap size of two, while the number of alterations 302-308 is greater than or equal to the burst size of three.

A fifth alteration to the portion of the code of interest 310 and a sixth alteration 312 to such portion of the code of interest occur at time-related events $t_8$ and $t_9$, respectively. As can be ascertained, the alteration 310 and the is not identified as being in a change burst, as the gap to alteration 308 is greater than the gap size of 2. Similarly, the alterations 310 and 312 are not identified as being in a change burst, as the number of alterations is less than the threshold burst size of three.

Alterations 314-320 occur at time-related events $t_{13}$, $t_{14}$, $t_{16}$, and $t_{17}$, respectively. These alterations 314-320 can be grouped together in a change burst, since gaps between any of the alterations that are adjacent to one another with respect to time-related events have a gap size of less than or equal to the threshold gap size of two, and the number of alterations 314-320 is greater than or equal to the threshold burst size of 3.

Figure 4:
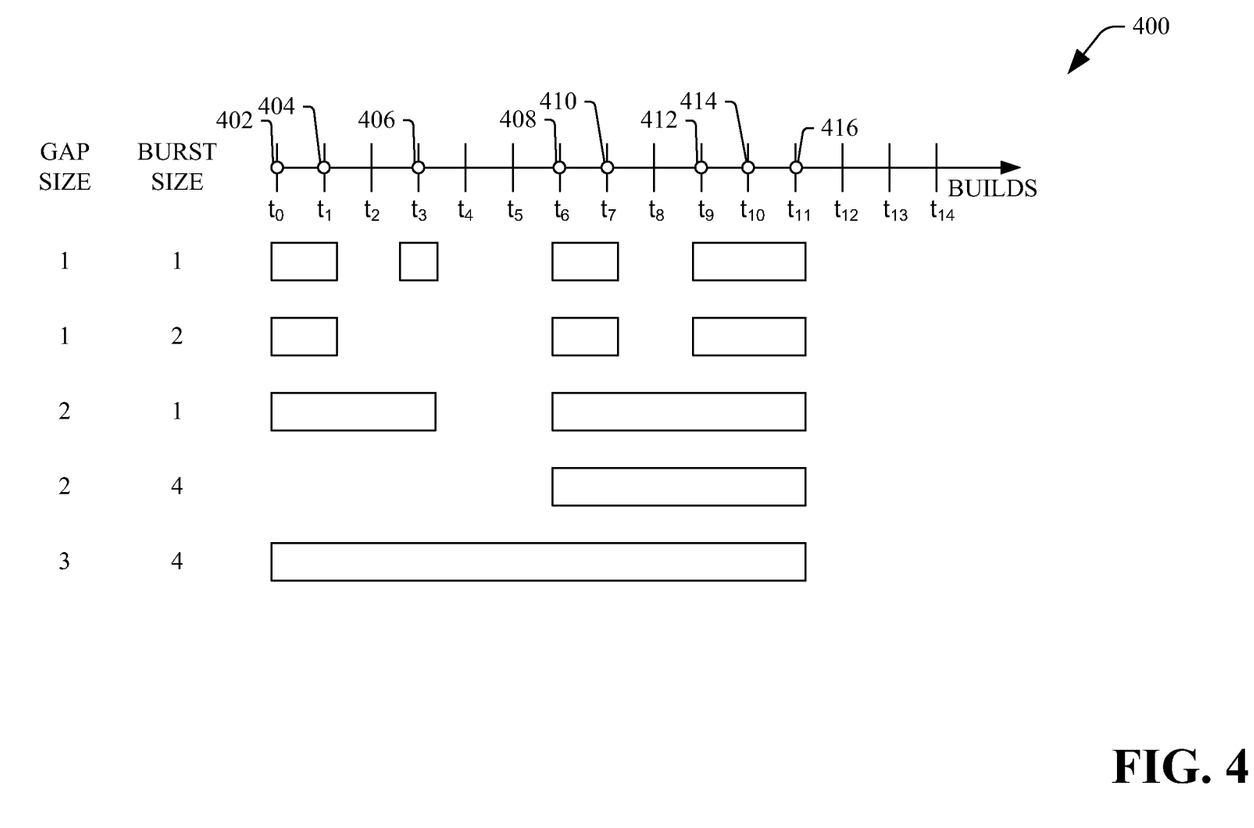
FIG. 4 is a graphical depiction of change bursts given different gap size and burst size requirements.

Now referring to FIG. 4, an example graphical depiction 400 of change bursts given different gap sizes and burst sizes is illustrated. The graphical depiction 400 shows that fifteen time-related events are subject to analysis, wherein eight alterations, 402-416, have occurred in such fifteen time-related events. Specifically, a first alteration 402 occurs at time-related event $t_0$, a second alteration 404 occurs at time-related event $t_1$, a third alteration 406 occurs at time-related event $t_3$, a fourth alteration 408 occurs at time-related event $t_6$, a fifth alteration 410 occurs at time-related event $t_7$, a sixth alteration 412 occurs at time-related event $t_9$, a seventh alteration 414 occurs at time-related event $t_{10}$, and an eighth alteration 416 occurs at time-related event $t_{11}$.

In the first example shown in FIG. 4, the gap size is set to one and the burst size is set to one, thereby creating multiple change bursts 418-424. Since the burst size is set to one, every change is included in a change burst, and changes that occur with respect to adjacent time-related events are grouped into a change burst. In the second example shown in FIG. 4, the gap size is set to one and the burst size is set to two, thereby creating multiple change bursts 426-430. In this example, alterations to the source code must occur in immediately adjacent time-related events to be considered change bursts. In the third example shown in FIG. 4, the gap size is set to two and the burst size is set to one, thereby creating change bursts 432 and 434. As can be ascertained, when the gap size is increased, smaller change bursts are merged (e.g., larger change bursts are created, as alterations to source code that occurred with respect to non-adjacent time-related events can be included in a single change burst).

In the fourth example shown in FIG. 4, the gap size is set to two and the burst size is set to four, thereby creating a change burst 436. In this example, the alterations 402, 404, and 406 are not included in a change burst, as the gap size between alterations 406 and 408 is not less than or equal to two (e.g., alteration 408 is three time-related events away from the alteration 406), and the number of alterations is not greater than or equal to the burst size (four). In the fifth example shown in FIG. 4, the gap size is set to three and the burst size is set to four, thereby creating a change burst 438. That is, each of the alterations are less than or equal to three time-related events from another alteration, and the number of alterations is greater than or equal to four.

Figure 5:
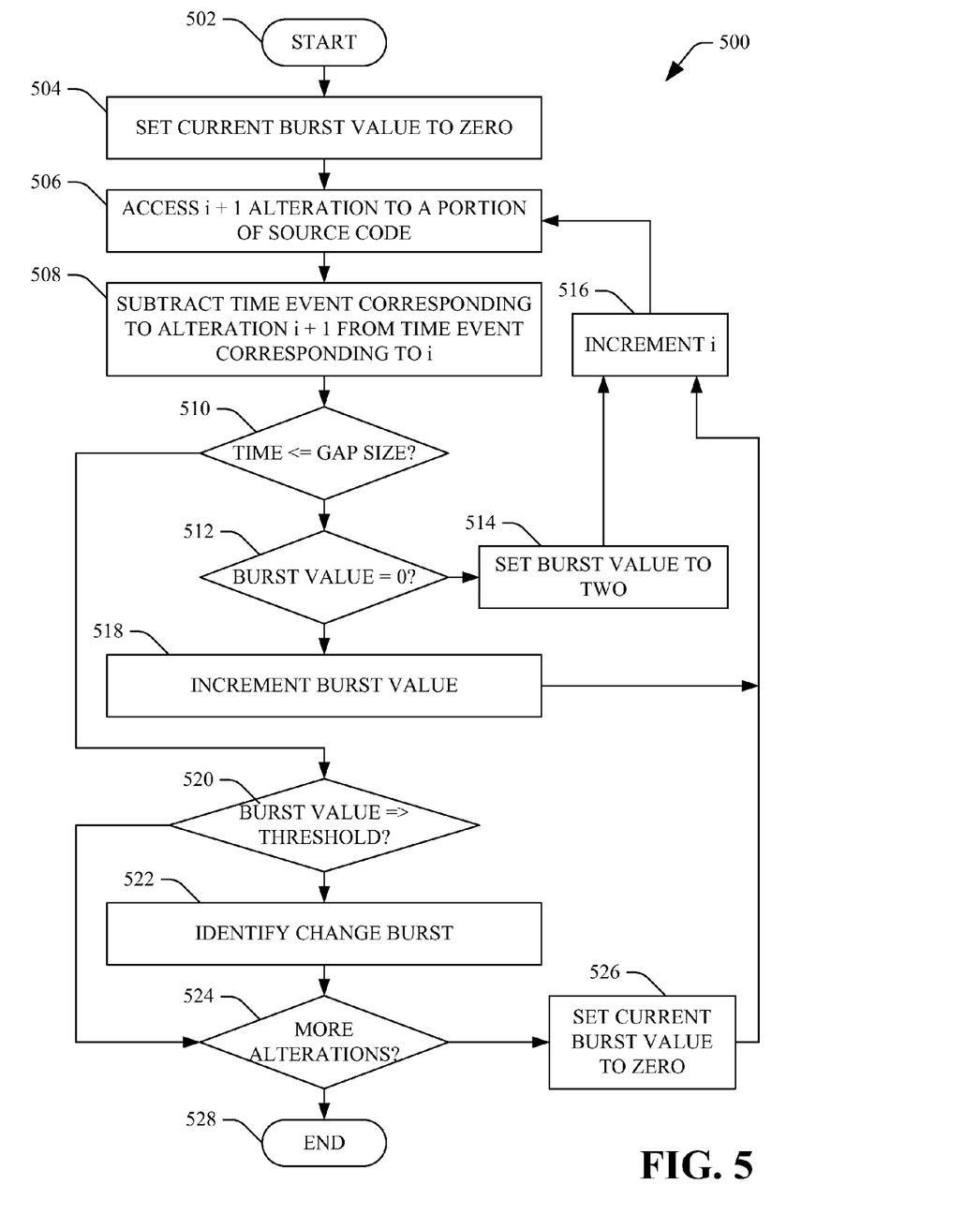
FIG. 5 is flow diagram that illustrates an example methodology for identifying change bursts with respect to a portion of code.
Figure 6:
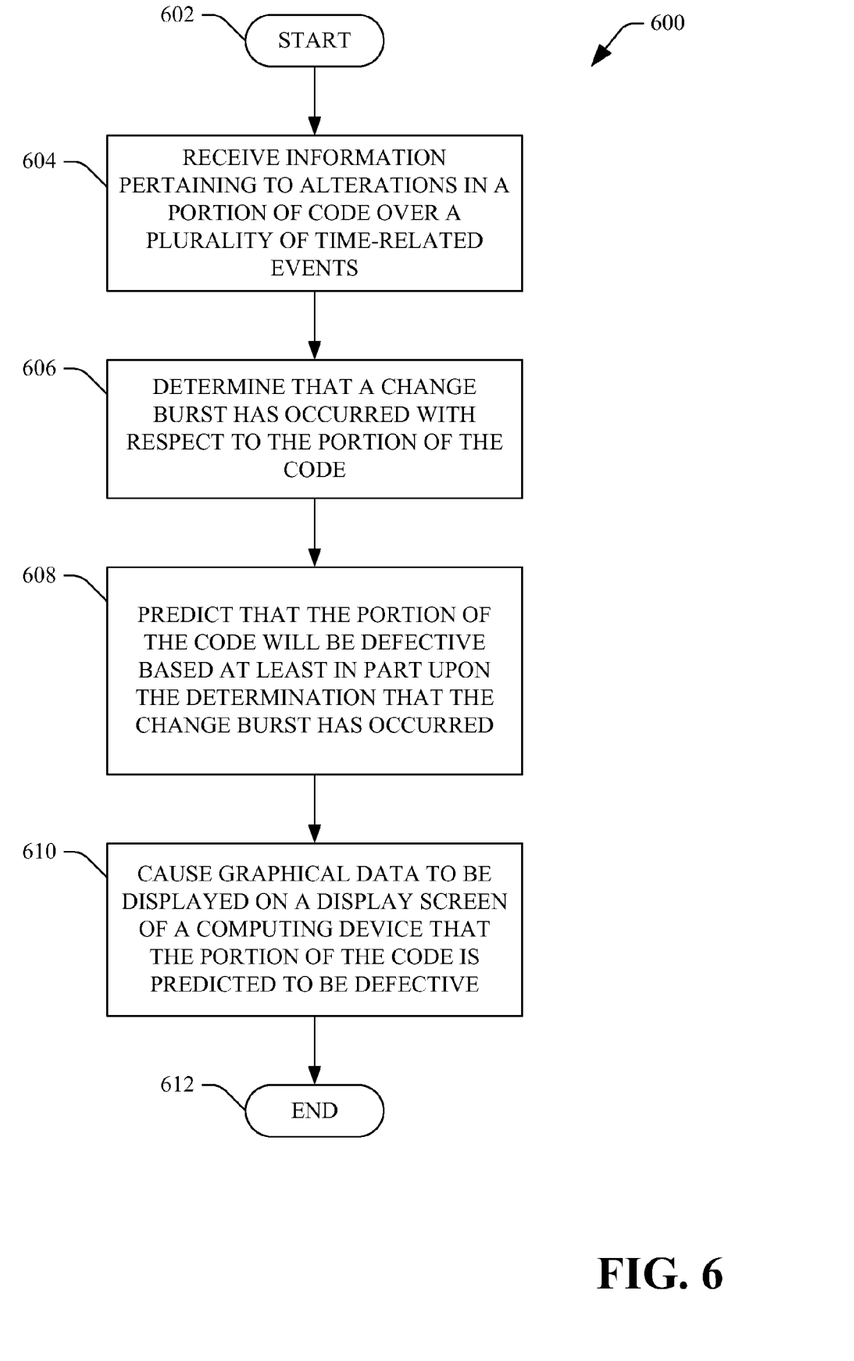
FIG. 6 is a flow diagram that illustrates an example methodology that facilitates predicting defects in a portion of code.

With reference now to FIGS. 5-6, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 5, a methodology 500 that facilitates identifying change bursts is illustrated. The methodology 500 begins at 502, and at 504 a current burst value is set to zero. For instance, in this methodology the current burst value can be a counter value that is used to track a number of alterations that occur within a threshold gap size from another alteration with respect to a portion of code of interest.

At 506, an i+1th alteration to a portion of code of interest is accessed. For instance, if an initial pass is undertaken with respect to the portion of code of interest, a second alteration to the portion of the code can be accessed.

At 508, a time event corresponding to the ith alteration is subtracted from the time event corresponding to the i+1th alteration. The subtraction undertaken at 508 provides an amount of gap (e.g., a number of time-related events) between the ith alteration and the i+1th alteration to the portion of the code.

At 510, a determination is made regarding whether the difference between the ith alteration and the i+1th alteration is less than or equal to a threshold gap size. If the difference in time-related events is less than or equal to the gap size, then the ith alteration and the i+1th alteration may be grouped together as a burst.

At 512, a determination is made regarding whether the current burst value is equal to zero (e.g., whether the ith alteration and the i+1th alteration are the first two alterations in the burst). If the current burst value is determined to be equal to zero at 512, then at 514 the current burst value is set to be equal to two. Thereafter, at 516, i is incremented, and the methodology returns to act 506.

If at 512 a determination is made that the current burst value is not equal to zero, then at 518 the current burst value is incremented. Thereafter, the methodology 500 proceeds to act 516 where i is incremented, and thereafter continues to act 506 where the i+1th alteration to the portion of the code is accessed.

If it is determined at 510 that the difference in time-related events between the ith alteration and the i+1th alteration is greater than the threshold gap size (not less than or equal to the threshold gap size), then the methodology proceeds to act 520, where the current burst value is analyzed. Specifically, a determination is made regarding whether the current burst value is greater than or equal to a threshold value for the burst size ($\beta$). The threshold value for the burst size can be set by an engineer, for instance, based upon experience of such engineer. Moreover, if desired, the threshold value for the burst size can be set to zero.

If it is determined at 520 that the current burst value is greater than or equal to the threshold value, then at 522 a change burst can be identified. Further, while not shown, at 522 metrics pertaining to the change burst can be generated and stored in a computer-readable medium or media and/or displayed on a display screen of a computing device.

If at 520 the determination is made that the current burst value is less than the threshold, or after a change burst has been identified at act 522, the methodology proceeds to 524 where a determination is made regarding whether there are additional alterations to the portion of the code of interest at later time-related events. If there are additional alterations to the portion of the code of interest, the methodology 500 proceeds to 526 where the current burst value is reset to zero. The methodology then continues to act 516 where i is incremented, and proceeds to act 506. If it is determined at 524 that there are no additional alterations to the portion of the code of interest, then the methodology 500 completes at 528. As described above, once a change burst is located, metrics pertaining to the change burst can be utilized in connection with predicting issues with the portion of the source code that is associated with the change burst.

With reference now to FIG. 6, a methodology 600 that facilitates predicting a defect in a portion of code is illustrated. The methodology 600 starts at 602, and at 604 information is received pertaining to alterations to code of an application over a plurality of time-related events. For instance, the information can be received from a version store that comprised multiple versions of the code. In another example, the information may be received in the form of a plurality of events pertaining to the code. As noted above, the application may be an operating system, a word processing application, a spreadsheet application, or other suitable computing application.

At 606, a determination is made that a change burst has occurred with respect to the portion of the code of the application. As described above, a change burst relates to a number of alterations of the portion of the code over a plurality of time-related events. For instance, determining that a change burst has occurred with a respect to the portion of the code of the application can include determining that at least two alterations to the portion of the code have occurred within a threshold number of time-related events with respect to one another. Furthermore, determining that a change burst has occurred with respect to the portion of the code of the application can include determining that a threshold number of alterations exist, wherein each of the alterations is within a particular time gap of at least one other alteration. Still further, metrics can be ascertained once the determination that the change burst has occurred has been accomplished. For instance, such metrics can be a number of alterations that occur in the change burst, a number of change bursts that occur with respect to the portion of the code over a threshold number of time-related events, a number of alterations that occur with respect to the portion of the code over a threshold number of time-related events, a number of alterations that occur in consecutive time-related events, etc.

At 608, a prediction is made that a portion of the code will be defective based at least in part upon the determination that the change burst has occurred. Furthermore, the prediction can be made based at least in part on one or more metrics that correspond to the portion of the code and/or the change burst. Additionally or alternatively, maintenance predictions can be made based at least in part upon the determination that a change burst has occurred with respect to the portion of the code, wherein maintenance predictions can indicate which portions of code will most likely require maintenance once the application is released. Still further, a recommendation can be output based at least in part upon the determination that the change burst exists with respect to the portion of the code.

At 610, graphical data is caused to be displayed on a display screen of a computing device, wherein the graphical data indicates that the portion of the code is predicted to be defective. The methodology 600 completes at 612.

Figure 7:
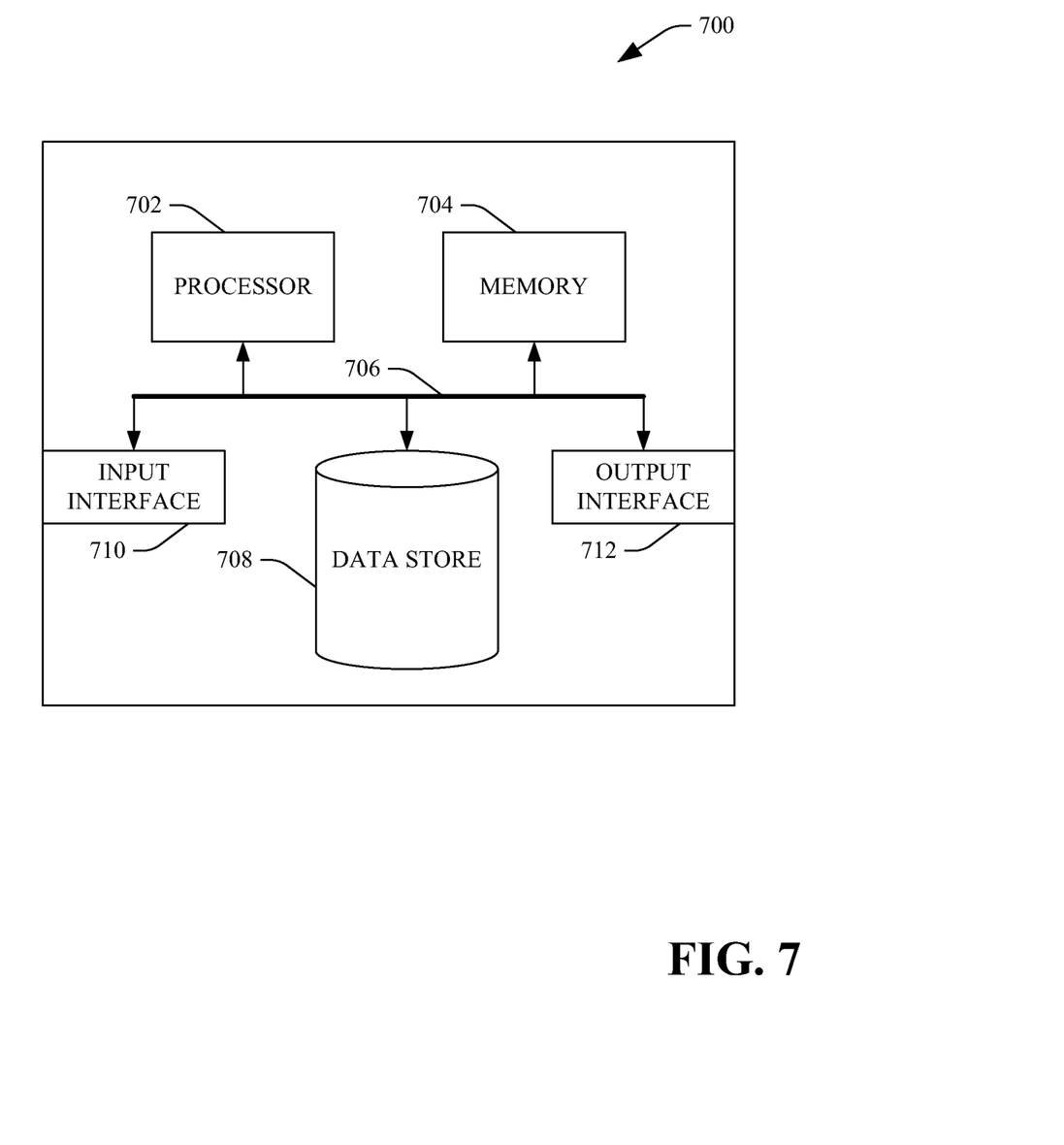
FIG. 7 is an example computing environment.

Now referring to FIG. 7, a high-level illustration of an example computing device 700 that can be used in accordance with the systems and methodologies disclosed herein is illustrated. For instance, the computing device 700 may be used in a system that supports identifying change bursts. In another example, at least a portion of the computing device 700 may be used in a system that supports predicting defects in code of an application, predicting maintenance issues in the code of the application, recommending actions to be undertaken with respect to code of an application, etc. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store versions of code, a threshold gap size, a threshold burst size, etc.

The computing device 700 additionally includes a data store 708 that is accessible by the processor 702 by way of the system bus 706. The data store 708 may include executable instructions, versions of code, identifications of change bursts in code, gap sizes, burst sizes, recommendations or predictions, etc. The computing device 700 also includes an input interface 710 that allows external devices to communicate with the computing device 700. For instance, the input interface 710 may be used to receive instructions from an external computer device, from an individual, etc. The computing device 700 also includes an output interface 712 that interfaces the computing device 700 with one or more external devices. For example, the computing device 700 may display text, images, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method that facilitates predicting defects in code that is configured to execute on a computing device, the method comprising:
    classifying a group of alterations made to a portion of code as being a change burst, the group of alterations being amongst a plurality of alterations made to the portion of the code over time, each alteration in the plurality of alterations assigned a time-related event that indicates when, in a sequence of time-related events, the alteration was made to the portion of the code, the group of alterations classified as being the change burst based upon:
        a number of alterations in the group of alterations being greater than a predefined threshold burst size; and
        each time-related event assigned to each alteration in the group of alterations being within a predefined threshold number of time-related events from at least one other time-related event assigned to another alteration in the group of alterations;
    predicting that the portion of the code is defective based upon the group of alterations being classified as a change burst; and
    displaying graphical data on a display that indicates that the portion of the code is predicted to be defective.

2. The method of claim 1, further comprising:
    responsive to classifying the group of alterations as being the change burst, computing a value for at least one metric of the change burst, the portion of code predicted to be defective based upon the value for the at least one metric, wherein the at least one metric comprises a number of alterations in the change burst.

3. The method of claim 1, further comprising:
    classifying multiple groups of alterations as being change bursts for the portion of the code, each group of alterations classified as being a change burst based upon:
        a number of alterations in each group of alterations being greater than the threshold burst size; and
        each time-related event assigned to each alteration in each of the groups of alterations being within the threshold number of time-related events from at least one other time-related event assigned to a different alteration in a same group of alterations; and
    predicting that the portion of the code is defective based upon a number of groups of alterations being classified as change bursts.

4. The method of claim 1, further comprising:
    responsive to classifying the group of alterations as being the change burst, computing a value for at least one metric of the group of alterations, the portion of code predicted to be defective based upon the value for the at least one metric, wherein the at least one metric is a number of alterations to the portion of the code in the change burst that occur in consecutive time-related events.

5. The method of claim 1, wherein each of the time-related events is one of a week, a day, or an hour.

6. The method of claim 1, wherein each of the time-related events are units of time within which respective builds have been performed.

7. The method of claim 6, wherein each unit of time in the units of time is one of a week, a day, or an hour.

8. The method of claim 1, further comprising:
    responsive to classifying the group of alterations as being the change burst, computing a value for at least one metric of the group of alterations, the portion of code predicted to be defective based upon the value for the at least one metric, wherein the at least one metric is a number of different developers identified as having made the alterations in the group of alterations.

9. The method of claim 1 configured for execution in an integrated development environment application.

10. The method of claim 1, wherein the portion of the code is one of a binary, a file, a package, or a class.

11. A system that facilitates predicting defects in a portion of code of an application that is configured to execute on a computing device, the system comprising:
    at least one processor; and
    memory that stores instructions that, when executed by the at least one processor, cause the at least one processor to perform acts comprising:
        defining a group of alterations as being a change burst, the group of alterations included in a plurality of alterations made to the portion of the code over time, each alteration in the plurality of alterations assigned a time-related event that indicates when, in a sequence of time-related events, the alteration was made to the portion of the code, wherein the group of alterations is defined as being the change burst based upon:
            a number of alterations in the group of alterations being greater than a predefined threshold burst size; and
            each time-related event assigned to each alteration in the group being within a predefined threshold number of time-related events from at least one other time-related event assigned to another alteration in the group of alterations;
        responsive to defining the group of alterations as being the change burst, generating a prediction that the portion of the code has at least one defect based upon at least one metric of the group of alterations; and
        causing the prediction to be displayed on a display that is in communication with the computing device.

12. The system of claim 11, the acts further comprising setting the predefined threshold number of time-related events.

13. The system of claim 12, the acts further comprising setting the burst size.

14. The system of claim 11, wherein the time-related events correspond to builds of the code, and a time duration of the time-related events is one of a week, a day, or an hour.

15. The system of claim 11, wherein the acts are performed when the at least one processor executes an integrated development application.

16. The method of claim 1, further comprising determining identities of people who made alterations included in the group of alterations, wherein the graphical data displayed on the display comprises the identities of the people.

17. The method of claim 1, further comprising determining a number of lines of code that have been altered in at least one alteration in the group of alterations, wherein the graphical data displayed on the display comprises the number of lines of code.

18. The system of claim 11, wherein the at least one metric is a number of lines of code in the portion of the code that were altered in the group of alterations.

19. The system of claim 11, wherein the at least one metric is a number of different developers that made alterations to the portion of the code in the group of alterations.

20. A system that is configured to predict a defect in code, the system comprising:

at least one processor; and memory that comprises instructions that, when executed by the at least one processor, cause the processor to perform acts comprising:

classifying a group of alterations made to a portion of code as being a change burst, the group of alterations being from a plurality of alterations made to the portion of the code over time, each alteration in the plurality of alterations assigned a time-related event that indicates when, in a sequence of time-related events, the alteration was made to the portion of the code, wherein the group of alterations is classifying as being the change burst because:

a number of alterations in the group is greater than a predefined burst size; and each time-related event assigned to each alteration in the group is within a predefined threshold number of time-related events from at least one other time-related event assigned to another alteration in the group;

generating a prediction that the portion of the code will have at least one defect based upon the group of alterations being classified as being the change burst; and displaying data that is indicative of the prediction on a display.

* * * * *